United States Patent [19]

Hsieh et al.

[11] 4,119,733
[45] Oct. 10, 1978

[54] METHOD OF MAKING SOYBEAN BEVERAGES

[75] Inventors: Dean Shui-Tien Hsieh, Brookline; Roselie Ann Bright, Cambridge; ChouKyun Rha, Boston, all of Mass.

[73] Assignee: Massachusetts Institute of Technology, Cambridge, Mass.

[21] Appl. No.: 796,589

[22] Filed: May 13, 1977

[51] Int. Cl.$^2$ .................................................. A23L 2/02
[52] U.S. Cl. ........................................ 426/46; 426/49; 426/50; 426/52
[58] Field of Search ....................... 426/44, 46, 50, 52, 426/590, 598, 629, 634, 656, 658, 460, 471, 481, 482, 483, 506, 507

[56] References Cited

U.S. PATENT DOCUMENTS

| | | | |
|---|---|---|---|
| 3,268,503 | 8/1966 | Mustakas et al. | 426/634 |
| 3,640,723 | 2/1972 | Uhlig et al. | 426/46 |
| 3,876,807 | 4/1975 | Wagner et al. | 426/634 |
| 3,901,978 | 8/1975 | Nelson et al. | 426/634 |
| 3,941,890 | 3/1976 | Drachenberg et al. | 426/46 |

*Primary Examiner*—R. B. Penland
*Attorney, Agent, or Firm*—Arthur A. Smith, Jr.; Paul J. Cook

[57] ABSTRACT

Soybean beverages are prepared by grinding dry, whole soybeans to a powder having a particle size less than about 420 microns. The powder is mixed with hot water to form a slurry, to soften the particles and to inactivate lipoxygenase. The slurry is homogenized and the pectin and cellulose components and the flatulence factors of the homogenized slurry are broken down by adding enzymes to the homogenized slurry.

7 Claims, No Drawings

METHOD OF MAKING SOYBEAN BEVERAGES

BACKGROUND OF THE INVENTION

This invention relates to a process for making a soybean beverage base such as soy milk or food products made therefrom.

The use of soybeans as a protein source in foods is well-known. In spite of their high protein content, marketing of soybean products has had limited success primarily due to an objectional flavor described as "beany flavor." This objectional flavor is not present in the original intact, whole soybeans, but develops immediately after maceration of the bean. The beany flavor is believed to result from the lipid oxidation by lipoxygenase (formerly known as lipoxidase). This undesirable oxidative reaction is accelerated in a liquid medium, especially in the presence of water.

Conventional processes for preparing soybean milk include the step of soaking the soybeans in water for many hours and then grinding the beans in water to dissolve or suspend the proteinaceous and other components in the aqueous medium. The suspension or slurry thereby obtained is filtered to remove undesirable large particles and the filtrate is heated. The resultant product is high in protein content. However, as the soaking time for soybeans increases (for example, overnight), larger quantities of water-soluble solids leak out from the beans into the soak water, which is discarded in the conventional methods and that disclosed in U.S. Pat. No. 3,901,978. Analysis of the dry solids found in the soak water showed the following composition: 23.3% crude protein, 2.8% fat, 0.5% sucrose and 63.7% other carbohydrates.

Soaking of soybeans is a necessary and important step in the previous inventions. Therefore, the burden of nutritional loss, microbial growth, space requirement and investment cost which are associated with soaking processes would be lifted if the soaking step was eliminated. It also has been proposed in U.S. Pat. No. 3,901,978, issued Aug. 26, 1975, to prepare soybean milk by a process whereby the lipoxygenase is inactivated in the intact soybean. In this process, the intact soybean is tenderized in an aqueous solution, preferably an alkaline solution for several hours. The intact tenderized soybean then is heated at a temperature and for a time sufficient to inactivate the lipoxygenase enzyme. The beans then are ground in water and the slurry is homogenized. The soybean beverage is characterized by a reduced but still distinct beany flavor. However, in this new process and more traditional processes of soymilk production, soybeans are soaked before grinding.

It would be highly desirable to provide a process for making soybean beverages which contain substantially the same protein content as the soybeans and which are substantially free of beany flavor. Furthermore, it would be desirable to provide such a process which provides a soybean beverage which has good mouth feel, digestibility and homogeneity.

SUMMARY OF THE INVENTION

This invention provides a process for producing soybean beverages from soybeans. Dry soybeans are ground to a powder in a relatively dry atmosphere. The powder is then added to hot water at a temperature between about 70° and 100° C. and heated therein for a sufficient time to inactivate the lipoxygenase and trypsin inhibitors and partially solubilize the soybean protein. The slurry then is homogenized. Enzymes are then added to the homogenized product to solubilize and hydrolyze the pectin and cellulose and flatulence factors of the soybean.

DETAILED DESCRIPTION OF SPECIFIC EMBODIMENTS

In this invention, the soaking process is eliminated to achieve a significant and definite advantage over other soymilk production methods thus far known. The reasons are that in this new process:

(1) capital investment required for containers, space and water is eliminated,
(2) microbial growth and contamination are minimized,
(3) off-flavor or undesirable flavor is eliminated,
(4) yield is increased,
(5) processing time is reduced.

Particularly, (3) above, (prevention of formation or development of off-flavor) is the major advantage of this invention. This is in contrast to all the known processes so far developed for soymilk production. In such processes, though an aqueous dispersion of whole beans for use is prepared by tenderizing intact soybean, heating to inactivate the lipoxidase, forming an aqueous slurry, homogenizing the slurry under pressure and recovering a stable aqueous dispersion, still off-flavor developed and other disadvantages mentioned above are inherent to the process. The purpose of this invention is to overcome all the disadvantages and also to improve acceptability both in flavor, texture and nutritional value. Any variety of soybean can be employed in the process of this invention including Hark, Wayne, Amsoy, Corsoy, Clark or the like.

The soybeans to be processed preferably are air-cleaned in a manner so as not to crack, bruise or damage the soybeans such as by conventional air clearing. The beans are inspected to remove foreign objects and any defective or damaged beans prior to grinding.

The beans are ground rapidly into fine particles having an average size of between about 10 microns and about 600 microns, usually between about 100 and 400 microns. The beans to be ground can be dehulled or ground with the hulls, the particles of which are separated in the manner described specifically below. Grinding is conducted rapidly so as to avoid excessive mechanical heat generation which leads to agglomeration of powdery particles and which will adversely affect subsequent suspension of the particles into water thereby leading to inferior products. Grinding is conducted continuously usually for less than about 2 minutes and preferably less than about 1 minute. Should the particles be too large after a grinding step, they are allowed to cool and grinding is repeated under the conditions set forth above. Grinding is conducted under dry state so that the lipoxygenase in the ground soybeans is not activated thereby preventing undesirable oxidation and avoiding the normally beany flavor. Conventional grinding apparatus can be employed such as a nut grinder, a hammer mill or a pulverizer. The ground powder may be classified to remove undesirably large particles.

The fine powder then is added to hot water maintained at a temperature between about 50° and 100° C., preferably between about 70° and 95° C. The weight of water employed is between about 2 and 30 times the weight of the powder, preferably between about 11 and 15 times the weight of the powder. The The amount of water to be added can be determined by the solid content in the final product. Ordinary tap water or distilled water may be employed, but it is preferred to employ water containing no chlorine, calcium or any cationic or anionic ions. The slurry is stirred while maintaining the temperature of the water until a homogeneous suspension of the particles is obtained. Usually a homogeneous suspension is obtained after stirring for about 20 to 30 minutes. The hot water provides a number of functions, including inactivation of lipoxygenase and inactivation of anti-trypsin factor. In addition, the water dissociates protein globules to permit improved emulsification of the final product. Since the rate of heat transfer to powder is much faster than with whole beans, the necessary process time of this invention is greatly reduced as compared to processes which heat soak whole beans.

Soaking of the soybean powder has substantial advantages over conventional processes wherein the whole soybean is soaked. When soaking whole soybeans, large quantities of water-soluble solids leach out from the beans which is discarded in conventional processes. Typically, the protein content of the whole bean is reduced from 43% to about 38% after soaking for 24 hours and to about 36% after soaking for 72 hours. Similarly, non-protein nitrogen content in the bean for the same time period increases from 0.16% to 0.28% and 0.86%. Not only is there substantial protein loss when soaking the whole beans, the increased soaking period requires the risk of microbial growth. In addition, soaking of whole beans requires substantial space and investment costs. In contrast, the soaking step of this invention permits recovery of about 100% of the protein, reduces process time by about 80% and permits substantially reduced capital investment and process space requirements.

After the homogeneous suspension is formed, it may be filtered if desired to eliminate large particles that may be present. The suspension then is homogenized by a homogenizer at a pressure of at least about 1000 psi and preferably between about 3000 psi and 4000 psi. The temperature of the suspension during homogenization is maintained between about 70° C. and 90° C. To assist in maintaining homogeneous particles distribution, the suspension may be stirred during homogenization. Homogenization can be carried out in conventional apparatus such as Gaulin Homogenizer, Crepa Co. Homogenizer or Tekmar Homogenizer. Satisfactory homogenization usually requires between about 1000 psi and 8000 psi. The homogenization step can be repeated to produce whiter and more stable dispersions of the soybean particles, usually three pass homogenization is sufficient to yield a uniform and stable quality product.

In accordance with this invention, the homogenized dispersion is treated to improve mouthfeel and taste. Poor mouthfeel results from the slimy components of the soybean such as pectin and carbohydrates which are difficult to break down with mechanical forces. In addition, the hull portion of the soybean causes chalky and gloppy mouthfeel in the final product. However, the hull particles may be retained in the final product when high fiber content in the final product is desired. In accordance with this invention, when it is desired to remove hull particles from the final product, either the soybeans are dehulled prior to grinding or the hull particles are removed after grinding the whole soybean. The hull particles are separated from the soybean particle suspended in hot water by precipitation, by centrifugation or by filtration. When producing low bulk feeding product, such as in infant formulae or dietetic nutritional beverages, the elimination of hull debris is especially appropriate. In order to improve mouthfeel of the product of this invention, enzymes are added to the homogenized dispersion in order to hydrolyze the components of the soybean that contribute to poor mouthfeel. Pectinase is added to the homogenized dispersion in order to selectively hydrolyze pectin and cellulase and/or hemicellulase is added to selectively hydrolyze cellulose. The enzymes can be added sequentially or in admixture. During hydrolysis, the dispersion is maintained at a temperature between about 20° C. and 40° C. and at a pH between about 4.0 and 7.0. Substantially complete selective hydrolysis is achieved usually within about 30 minutes. The concentration of each enzyme added to the dispersion is between about 1/500 and 1/20 weight percent, preferably between about 1/100 and 1/50 weight percent based upon the weight of the pectin or cellulose. As a result of hydrolysis, the viscosity of the dispersion is substantially reduced with a reduction from 6.7 centipoise to 3.1 centipoise after 5 minutes of hydrolysis with pectinase and cellulase being typical. In this manner, solid particle content is decreased, viscosity decreased, the dispersion becomes more homogeneous and the mouthfeel is converted to a more smooth and creamy texture.

The addition of pectinase or cellulase and/or hemicellulase also improves the taste and sweetness of the dispersion. Hydrolysis of cellulose yields xylose and glucose. Hydrolysis of hemicellulose yields xylose, arabinose, galactose, glucose and mannose. Hydrolysis of pectin yields galacturonic acid and some glucuronic acid.

When producing low bulk feeding product where fiber content should be kept at a minimum such as in infant formulae or dietetic nutritional beverages, the elimination of hull debris is especially appropriate. In such cases, in accordance with this invention, the hull may be removed after cracking and prior to grinding of the beans. Or, if desired, the hull particles may be separated from the soybean particle after suspending them in hot water by sedimentation, centrifugation or filtration.

In the alternative embodiment of this invention, a reduction or elimination of the constituents of soybeans that cause flatulence can be effected. Flatulence problems are caused by raffinose, trisaccharide and strachyose, a tetrasaccharide and they can be reduced or eliminated from the soybean dispersion by hydrolysis with enzymes. Strachyose can be hydrolyzed by emulsin to yield galatose and raffinose or galactobiose and sucrose. Raffinose can be hydrolyzed with invertase to yield melibiose and D-fructose. Alternatively, raffinose can be hydrolyzed with alpha-galactosidase or an enzyme containing alpha galactosidase such as emulsin. Hydrolysis of raffinose and/or strachyose is conducted under the same conditions set forth above for hydrolysis with the other enzymes.

After any or a combination of the enzyme treatments described above, the water suspension of soybean powder is subjected to further heating and homogenization to inactivate enzymes and to improve the stability of the product.

It is to be understood that the soybean beverages produced in accordance with this invention can be fortified in any conventional manner such as by addition of lipids, sugars, minerals, corn syrup, corn oil and/or vitamins or the like. The beverage produced by this invention can be consumed directly or can be used to produce dairy substitutes such as cream, yogurt, soybean curd, yuba or the like.

The following examples illustrate the present invention and are not intended to limit the same.

EXAMPLE I

Whole Arkansas variety soybeans were cleaned by being air cleaned to separate foreign particles from the soybeans. About ⅓ pounds of dry whole beans then were ground in an electric grinder to fine particles having a diameter less than 420 microns. Grinding was conducted for about 1 minute per pass and the beans were ground in one or more passes through the electric grinder. About ⅓ pounds of the powder then was added to 4 pounds of distilled water which was at a temperature of about 85° C. The powder-hot water slurry was stirred for about 30 minutes while the temperature of the slurry was maintained at about 85° C. The soybean particles became softened and the lipoxygenase (trypsin inhibitors) inactivated in the hot water. The slurry then was passed through a homogenizer in 1 pass at 3,500 psi in order to homogenize the slurry.

To the homogenized slurry was added 1 milligram of cellulase while the slurry was maintained at a temperature of 25° C. and a pH of 5.0. pH adjustment was made by adding 1 N NaOH to the homogenized slurry prior to adding the cellulase. The cellulase-slurry mixture was stirred for about 30 minutes. Concurrently, 1 milligrams of pectinase was also added to the slurry. The enzyme treated slurry was homogenized for the second time at 5000 ~ 7000 psig for one or more passes.

The resultant product was stable without clear separation for at least 8 months when stored in a room at 25° C. The product was characterized by excellent mouthfeel and a viscosity of about 7.0 centipoise. As measured with a Coulter Counter model TAII, about 90% of the particles had a diameter less than about 2.0 microns.

EXAMPLE II

Whole Arkansas variety soybeans were cleaned by being air cleaned to separate foreign particles from the soybeans. About 150 grams soybeans were ground in an electric grinder to particles having a size less than 420 microns. The particles then were soaked in 2000 ml distilled water at 85° C. for 30 minutes. The particles became softened and the lipoxygenase was inactivated in the hot water. The slurry then was homogenized in 1 pass at 85° C. and 3,500 psi. The slurry then was cooled to 30° C. and the pH was adjusted to 5.0 with $NH_4Cl$. To the slurry was added 40 mg invertase, 40 mg emulsin, 50mg cellulase and 50 mg pectinase which were allowed to hydrolyze for 15 minutes. The slurry pH then was adjusted to 7.0 with 15% NaOH and the slurry then was heated to 70° C. To the slurry was added sucrose and salt to adjust the taste of the slurry and the volume of the slurry was adjusted to 2000 ml by addition of distilled water. The slurry then was homogenized in two passes in a Gaulin homogenizer at 7000 psi. After the second homogenization, 1000 ml distilled water was added and the resultant product was homogenized again at 7000 psi.

The resultant product had a viscosity of about 7.7 centipoise and was stable for at least 8 months at 25° C. without clear phase separation. About 90% of the particles in suspension had a diameter less than 2.00 microns as measured with a Coulter Counter model TAII.

We claim:

1. A method for preparing a soybean beverage which comprises:
    a. grinding whole dry soybeans to a powder of a particle size less than about 420 microns, while avoiding excessive heat generation
    b. mixing said powder with water at a temperature between about 50° C. and 100° C. to form a slurry to soften the particles and to inactivate lipoxygenase,
    c. homogenizing the slurry and
    d. adding enzymes to the homogenized slurry to break down the cellulose, pectin and flatulent components of the homogenized slurry 2. The process of claim 1 wherein the soybeans are dehulled prior to grinding.

3. The process of claim 1 wherein the soybean hulls are separated from the ground soybeans after grinding.

4. The process of claim 1 wherein the enzymes comprise cellulase, pectinase and hemicellulase which can be added individually or in combination.

5. The process of claim 1 which includes the step of adding a second enzyme composition to break down raffinose and strachyose.

6. The process of claim 1 wherein the hulls of the soybeans are ground with the soybeans.

7. The process of claim 1 which includes the step of adding soybean hull fiber to the beverage.

* * * * *